(12) United States Patent
Aitcin

(10) Patent No.: US 6,656,068 B2
(45) Date of Patent: Dec. 2, 2003

(54) PULLEY HAVING PROGRESSIVELY VARIABLE SHEAVE ANGLE

(75) Inventor: Xavier-Pierre Aitcin, St-Hyacinthe (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/947,546

(22) Filed: Sep. 7, 2001

(65) Prior Publication Data

US 2002/0042313 A1 Apr. 11, 2002

Related U.S. Application Data

(60) Provisional application No. 60/230,784, filed on Sep. 7, 2000.

(51) Int. Cl.[7] ............................ F16H 55/56; F16H 63/02
(52) U.S. Cl. ................................ 474/8; 474/14; 474/12; 474/17
(58) Field of Search ............................ 474/8, 12, 13, 474/14, 16, 25, 17

(56) References Cited

U.S. PATENT DOCUMENTS

| | | | |
|---|---|---|---|
| 583,402 A | 5/1897 | Reeves | |
| 668,581 A | 2/1901 | Martin | |
| 3,548,670 A | 12/1970 | Schnegg et al. | |
| 3,958,461 A | * 5/1976 | Aaen et al. | 474/14 |
| 4,276,041 A | 6/1981 | Steuer | |
| 4,504,248 A | 3/1985 | Hollinger | |
| 4,575,363 A | 3/1986 | Burgess et al. | |
| 4,795,406 A | 1/1989 | Dittrich et al. | |
| 5,172,786 A | * 12/1992 | Ishibashi et al. | 474/12 |
| 5,326,330 A | 7/1994 | Bostelmann | |
| 5,328,412 A | 7/1994 | Durum | |
| 5,792,013 A | 8/1998 | Heinrich et al. | |
| 5,797,816 A | 8/1998 | Bostelmann | |
| 5,967,286 A | * 10/1999 | Hokanson et al. | 192/110 R |
| 6,086,492 A | * 7/2000 | Nakano et al. | 474/16 |
| 6,155,371 A | * 12/2000 | Izumi | 474/13 |

FOREIGN PATENT DOCUMENTS

DE 3204059 A1 * 8/1983

OTHER PUBLICATIONS

Bombardier "Ski–Doo" Parts Catalog, MX Z Driven Pulley, 2000.
SAE Leaf Springs for Motor Vehicle Suspension, Nov. 1992.
SAE V–Belts and Pulleys, May 1992.
Power Transmission Losses in V–Belt Drives–T.H.C. Childs, 1987.
British Standard Automobile Series–Automotive V–Belts and Pulleys, 1984.
Pressure Distribution and Belt Deformation in V–Belt Drives–Gerbert, Aug. 1975.

* cited by examiner

*Primary Examiner*—Marcus Charles
(74) *Attorney, Agent, or Firm*—Pillsbury Winthrop LLP

(57) ABSTRACT

A pulley system for use in a constant variable transmission includes a pair of pulley sheaves or flanges mechanically linked by a belt so that the outer surfaces of the belt interact with the inner surfaces of the flanges. At least one of the pulley flanges has an inclined inner surface disposed at an angle that changes progressively based on a curve have a variable radius. For example, the sheave angle can change progressively from 9 degrees to 12 degrees or from 12 degrees to 14 degrees, with no sharp or stepped edges. The belt can have a complementary angled surface also. The progressively variable angle allows the flange surface to more closely match the side surface of the belt, which can increase the belt life be reducing stress experienced by the belt. The pulley system is useable in a transmission for a vehicle, for example a snowmobile or an all terrain vehicle.

25 Claims, 3 Drawing Sheets

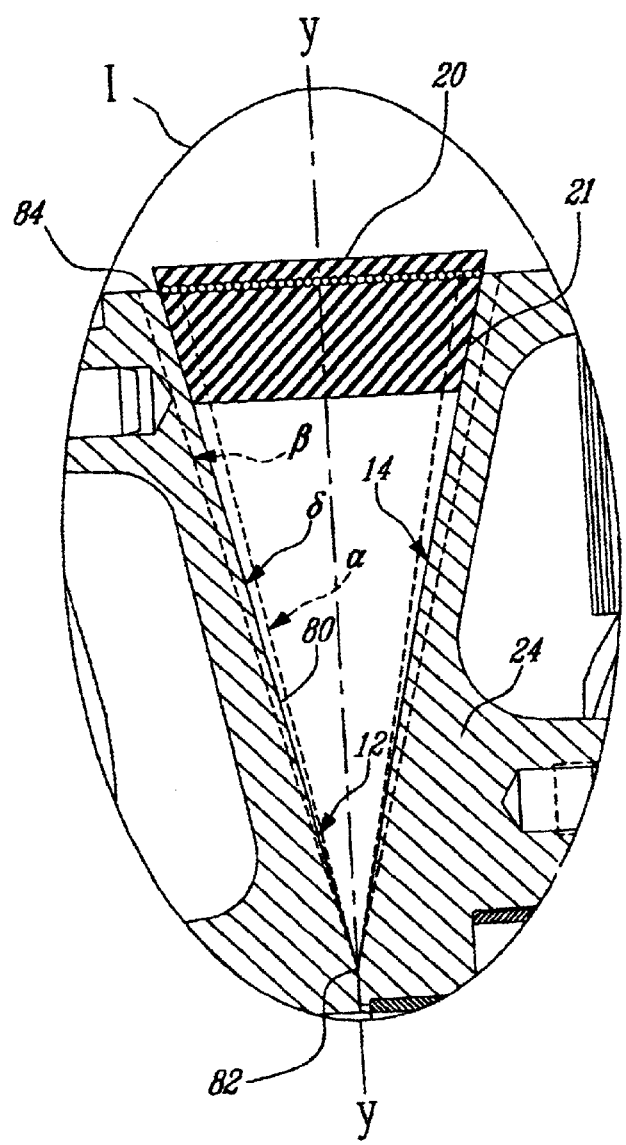
FIG_3
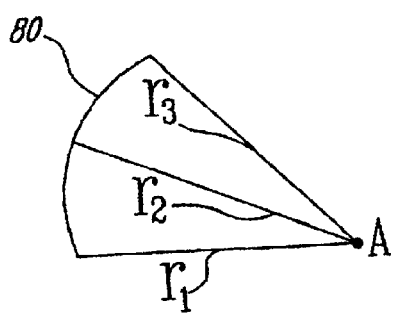
FIG_4

PULLEY HAVING PROGRESSIVELY VARIABLE SHEAVE ANGLE

This application claims the benefit of provisional application 60/230,784 filed Sep. 7, 2000.

BACKGROUND OF THE INVENTION

1. Field of the Invention

The invention relates to a pulley system for use in a transmission, particularly a constant variable transmission. The invention more specifically relates to the pulley flange, also known as a sheave, and belt in such a pulley system.

2. Description of the Related Art

Variable ratio drive pulleys, which are known, are generally employed to transmit a drive force from an engine via a belt transmission to a driving mechanism. Typical pulley systems comprise a pair of opposed frusto-conical flanges or sheaves mounted on the output shaft of the engine and arranged to apply a drive to an endless flexible belt positioned between the flanges. Both flanges rotate with the output shaft, one flange being axially fixed, and the other flange being axially shiftable towards and away from the fixed flange. A mechanism is generally provided to urge the movable flange away from the fixed flange so that at idling or low engine speeds there is no driving contact between the flanges and the belt, and no torque is transmitted.

To effect driving engagement between the flanges and the belt, such pulleys include an actuating mechanism such as centrifugally actuated weights, levers and the like that respond to increasing engine speeds to apply an axial force to the movable pulley flange to shift it against the spring towards the fixed flange and drivingly engage the belt between the flanges. The drive ratio is determined by the diameter of the belt path where it is engaged by the flanges, and varies with shifting of the movable flange towards or away from the fixed flange.

An example of a variable ratio drive pulley is described in U.S. Pat. No. 4,575,363, which is hereby incorporated by reference into this disclosure in its entirety.

In a constant variable transmission, the belt rides the inner surface of the sheave pulley and is thus subjected to stress during operation. Conventional sheave pulleys have surfaces that are conical and incline at a constant angle. In such constant variable transmissions, belt life has been a problem, especially for consumers, because the stress experienced by the belts can cause failure. Other pulley systems use curved sheave surfaces, such as U.S. Pat. No. 4,631,042, in which the sheave surface curves based on a constant radius R to reduce the pressure at contact points between the belt and the sheave.

One way of strengthening the belt to alleviate problems associated with stress is to thicken the belt. However, wider belts create higher power losses because the inside of the belt deforms. Also, the centrifugal force on thicker belts is higher, and more heat is generated during operation thus decreasing the efficiency of the belt. Tension can be varied in the belt by adjusting the angle of inclination of the inner surface of the sheave. Thus, some devices use a smaller belt while still addressing the problems associated with stress by providing sheave pulleys with inner surfaces having variable sheave angles.

U.S. Pat. No. 3,548,670 is an example of a pulley system in which the sheave surface has several discreet sections, each having a different angle of inclination with a step therebetween, to increase the output range by increasing the adjusting range by providing different cone angles. The disadvantage in this case is the change in angle of inclination creates a point or an edge which increases the stress on the belt when the belt is rotating at the radius of the edge.

Another common problem for such pulley systems is belt misfit, often due to distortion of the belt from bending it on the pulley. A belt's bending distortion varies with the radius to which it is bent and also varies with the belt material. The distortion can result in power loss. To enhance efficiency, the belt should match the pulley as closely as possible, which is difficult to achieve when the belt is distorted.

As is well known in the automobile industry, constant variable transmissions are used in combination with steel belts which do not distort due to the pressure from the sheaves, this permits the sheave angles to have a frusto-conical shape and obtain a high efficiency output. The benefits of steel belts however would be difficult to obtain in a high-rev engine such as the two-stroke engines used in a snowmobile. In order to use a CVT with a steel belt in a snowmobile, an additional gear box would have to be used to decrease the RPM's of the engine to that suitable for use with a CVT using a steel belt.

Accordingly, there is a need for a pulley system that provides adjustability and also manages belt stress to enhance belt life. There is also a need to provide a system that is designed to match the pulley to the belt to increase efficiency.

SUMMARY OF THE INVENTION

An aspect of embodiments of the invention is to provide a pulley system in which the sheave surface is progressively angled and traverses an arc that has a variable radius.

Another aspect of embodiments of the invention is to provide a sheave surface that corresponds to the belt edge. With close correlation between the side angle of the belt and the sheave angle, the power loss during clutching of the constant variable transmission is reduced.

A further aspect of embodiments of the invention is to provide an arrangement that can enhance belt life. A pulley system in accordance with embodiments of the invention can increase belt life by reducing stress experienced by the belt since the sheave surface can closely match the profile of the belt.

An additional aspect of embodiments of the invention is to provide an arrangement that can reduce power loss during operation.

These and other aspects of the invention can be realized by providing a variable drive pulley assembly for use in a transmission including a drive shaft rotatable about an axis of rotation, a fixed flange supported for rotation on the drive shaft, and a movable flange supported for rotation on the drive shaft and axially movable on the drive shaft toward and away from the fixed flange. The fixed flange has a first inner surface and the movable flange has a second inner surface that faces the first inner surface. A biasing mechanism is disposed adjacent to the movable flange that urges the movable flange away from the fixed flange. A torque transmitting mechanism is coupled to the movable flange and transmits driving torque from the drive shaft to the movable flange to move the movable flange toward the fixed flange. At least one of the first inner surface and the second inner surface is disposed at an angle inclined from a reference line perpendicular to the axis of rotation. The angle progressively varies across the at least one inner surface and follows an arc having a variable radius.

The variable drive pulley can further include a drive belt disposed between the fixed flange and the movable flange, wherein the drive belt is slidable along the inner surfaces of the fixed flange and the movable flange. The belt can have an outer surface that is complementary to the at least one inner surface of the respective fixed flange and movable flange.

The invention also provides a constant variable transmission including a drive shaft rotatable about an axis of rotation, a pulley sheave assembly mounted on the drive shaft, and a belt coupled to a drive mechanism and disposed around the drive shaft and the pulley sheave assembly. The pulley sheave assembly includes a fixed flange supported for rotation on the drive shaft and a movable flange supported for rotation on the drive shaft and axially movable on the drive shaft toward and away from the fixed flange. The fixed flange has a first inner surface and the movable flange has a second inner surface that faces the first inner surface. At least one of the first inner surface and the second inner surface is disposed at a progressively variable angle with respect to a reference line that is perpendicular to the axis of rotation. A biasing mechanism is disposed adjacent to the movable flange that urges the movable flange away from the fixed flange. A torque transmitting mechanism is coupled to the movable flange and transmits driving torque from the drive shaft to the movable flange to move the movable flange toward the fixed flange. The movable flange engages the belt and the belt moves across the first and second inner surfaces based on transmitted torque. At least one of the first inner surface and the second inner surface is disposed at an angle inclined from a reference line perpendicular to the axis of rotation, wherein the angle progressively varies across the at least one inner surface and follows an arc having a variable radius.

The invention also provides a method of transmitting drive force from an engine to a drive assembly while varying a drive ratio between a drive pulley assembly coupled to the engine and a transmission belt coupled to the drive assembly. The method includes providing a drive force to a rotatable shaft, transferring drive torque from the rotatable shaft to a drive pulley assembly having a fixed flange and a movable flange and moving the movable flange toward the fixed flange, engaging a transmission belt between inner facing radial surfaces of the fixed flange and the movable flange, and varying the drive ratio between the belt and the drive pulley assembly by sliding the belt across the inner surfaces of the fixed flange and the movable flange. The inner surfaces are disposed at a progressively variable angle with respect to a reference line perpendicular to the axis of rotation of the rotatable shaft and follow an arc having a variable radius.

The pulley system in accordance with the invention can be used in any suitable transmission, especially a constant variable transmission. The pulley is well suited for use in vehicles, including but not limited to snowmobiles, all terrain vehicles (ATVs), tractors, scooters, agricultural vehicles, automobiles or trucks.

These aspects and other aspects, objects and advantages of the invention will become apparent from the following description and drawings that illustrate preferred embodiments of the invention.

BRIEF DESCRIPTION OF THE DRAWINGS

Referring to the drawings that form part of this disclosure:

FIG. 3 shows an enlarged portion of FIG. 2 at portion I illustrating an angled sheave surface; and FIG. 4 shows a schematic drawing of the surface of the pulley flange with the variable radii.

DETAILED DESCRIPTION OF EXEMPLARY EMBODIMENTS

The pulley system in accordance with the invention is described in use with a constant variable transmission (CVT) for purposes of illustration. However, it is understood that the progressively angled sheave of this invention can be used in any suitable drive system. Further, it is noted that the pulley system, and particularly the sheave, described herein according to embodiments of this invention can be applied to a drive and/or driven clutch of a CVT and can be applied in various transmissions, especially vehicle transmissions used in snowmobiles, all terrain vehicles, automobiles and the like, schematically illustrated in FIGS. 1 and 2 by reference number 100.

Figure 1:
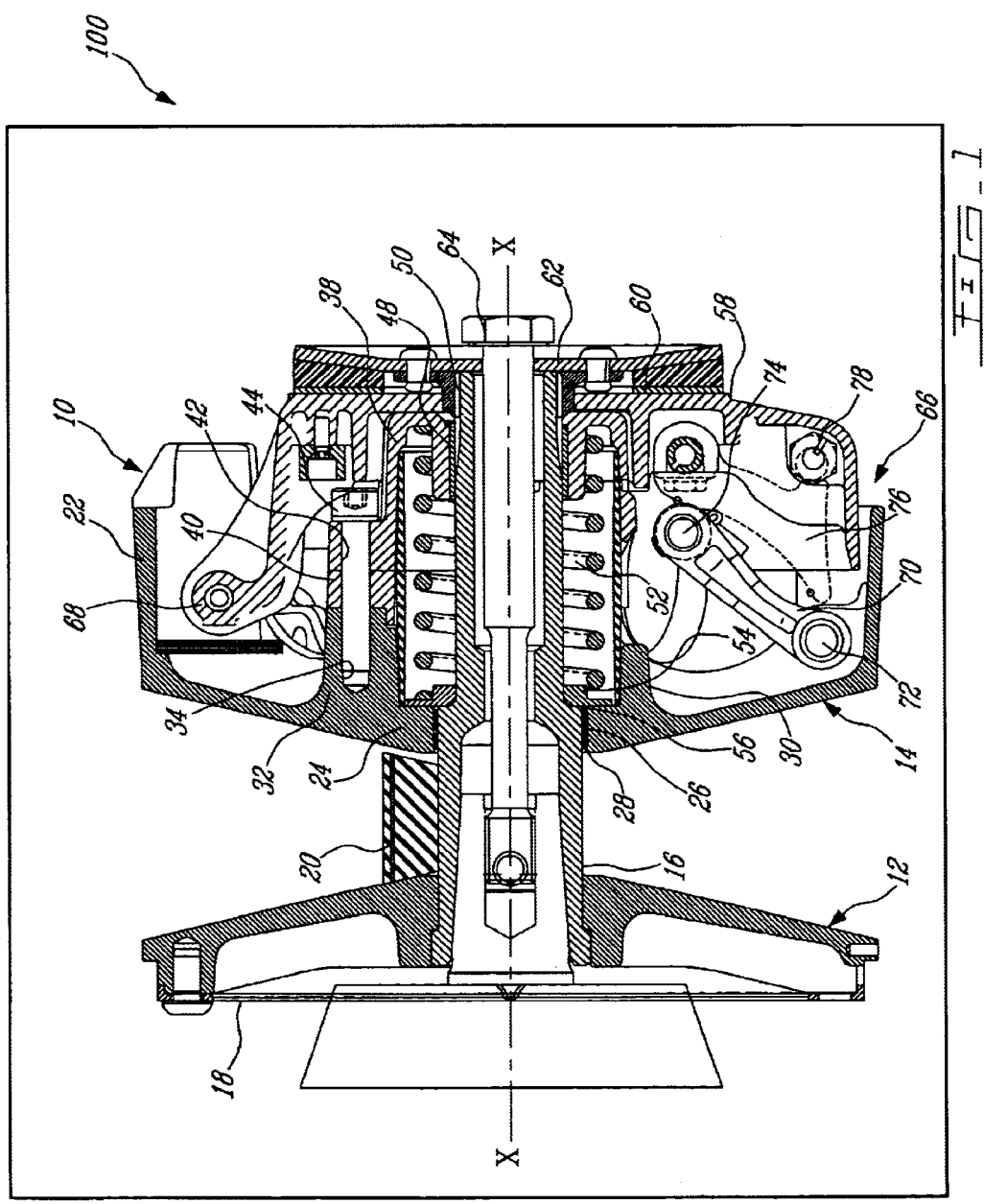
FIG. 1 show a side view in cross section of a pulley system in accordance with an embodiment of the invention with the belt in a first position.
Figure 2:
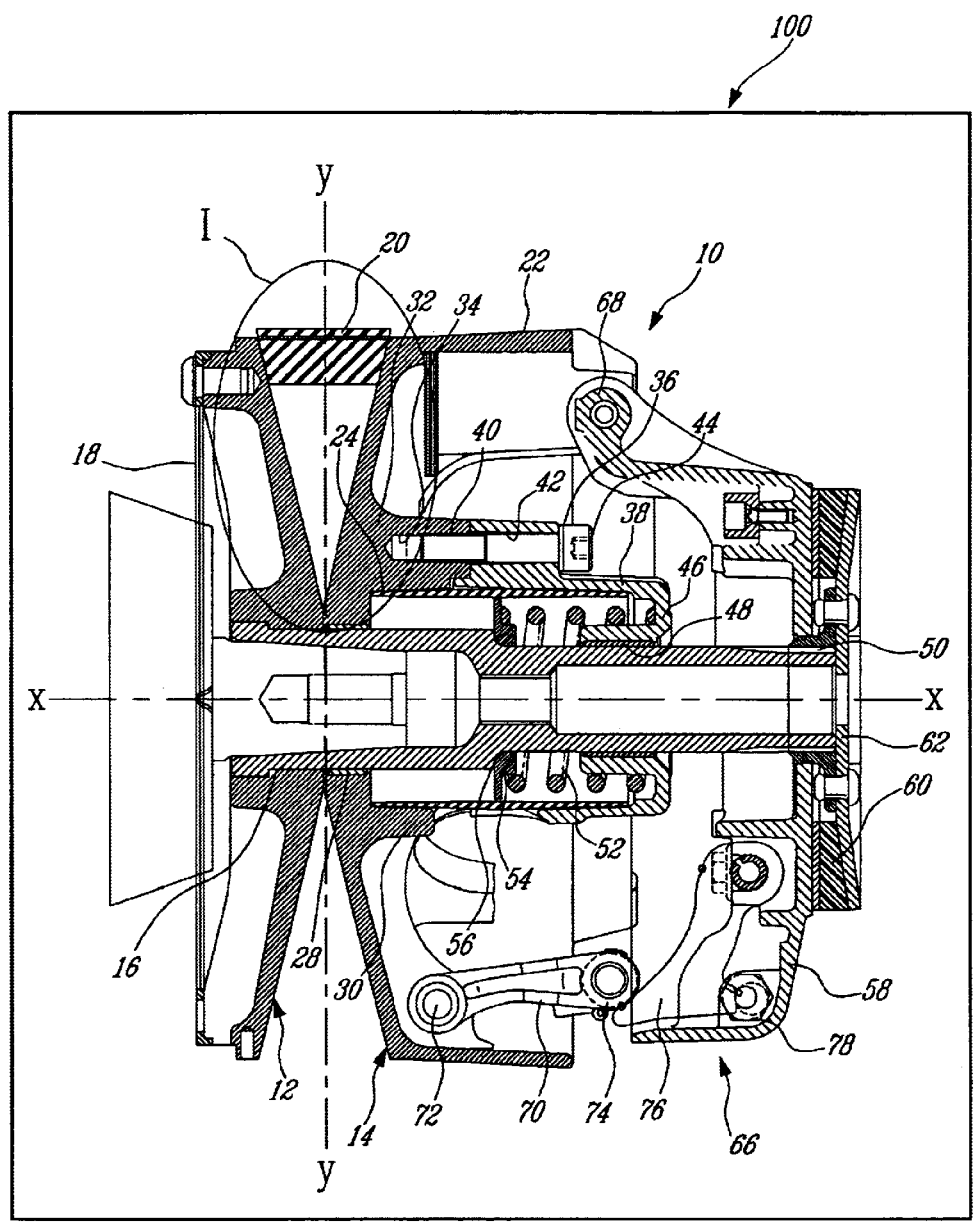
FIG. 2 show a side view in cross section of a pulley system in accordance with an embodiment of the invention with the belt in a second position.

As shown in FIGS. 1 and 2, the variable ratio drive pulley assembly 10 includes two sheaves in the form of two frusto-conical flanges 12 and 14 co-axially arranged with respect to a drive shaft 16. Drive shaft 16 is adapted to be attached to an output shaft of an engine, for example, a snowmobile engine. Both flanges 12 and 14 are supported to rotate with shaft 16 about axis X—X. Fixed flange 12 is axially fixed to shaft 16 and is secured to shaft by a collar 18. Of course, any method of securement between flange 12 and shaft 16 can be used, such as threaded engagement without a collar if desired.

As described below, movable flange 14 is axially movable with respect to shaft 16, flanges 12 and 14 are configured to cooperate in applying a driving engagement to an endless belt 20, shown in trapezoidal cross-section, arranged between the flanges. Of course, any suitable belt shape or size can be used including belts with curved or angled edges. However, as discussed below, using a belt 20 that closely corresponds in edge shape to the flange surface can increase efficiency and reduce power loss by reducing deformation and stresses in the belt.

Movable flange 14 has a cylindrical peripheral skirt 22 projecting axially rearwardly away from fixed flange 12 and a central hub 24 that define a bore 26. A bushing 28 preferably formed of a smooth low friction material slides on an intermediate section of shaft 16. An annular wall 30 projects from the read side of hub 24 and has three thickened sections 32 arranged at equal angular intervals about the axis X—X of shaft 16. Each thickened section 32 defines a screw-threaded axially directed bore 34 that opens to the end face 36 of wall 30.

A spring cover 38 abuts with wall 30 and is likewise formed with three thickened sections 40 having through bores 42 aligned with bores 34. Each bore 42 and 34 receives the shank of a cap screw 44 which is threaded into bores 42 and 43 to secure cover 38 in place. Cover 38 has a closed end wall 46 with an inner cylindrical surface that seats a bushing 48, which is in sliding engagement with a reduced diameter end section 50 of shaft 16.

A coiled compression spring 52 is positioned within a chamber formed by annular wall 30 and cover 38. One end of spring 52 is seated against the end wall 46, and the other end of spring 52 presses against an annular spring seat 54. Spring seat 54 is disposed around reduced diameter section 50 of shaft 16 against a shoulder 56.

As seen by comparing FIGS. 1 and 2, axial displacement of movable flange 14 towards the fixed flange 12 effects compression of spring 52. Movable flange 14 is guided by sliding of bushing 48 on end section 50 of shaft 16 and of bushing 28 on the intermediate section of shaft 16.

The rear side of movable flange 14 is substantially enclosed by an end cover or cup 58. A central torque flange 60 is secured to the end of shaft 16 by interlocking grooves 62 and clamps cup 58 to shaft 16 by bolt 64, which is in threaded engagement with the engine crankshaft (not shown). Bolt 64 thus maintains torque flange 60 in engagement so that cup 58 is fixed to rotate with shaft 16. Cup 58 effectively closes the rear side of movable flange 14 and forms a casing, with the outer portions of cup 58 being received within cylindrical skirt 22. The other internal details shown in the Figures are known and are therefore not described in detail.

Axial displacement of movable flange 14 with respect to shaft 16 is controlled by a centrifugal mechanism 66. A guide 68 provides a driving connection between shaft 16 via cup 58 to movable flange 12 and provides axial guidance during displacement. Three sets of centrifugal mechanisms 66 are provided at equal angular spacing around the axis of shaft 16 and symmetrically arranged with respect to guide 68. Each centrifugal mechanism 66 comprises a weighted lever 70 pivoted on a pin 72 carried in bearing lugs formed at the root of skirt 22 on the rear of movable flange 14. The opposite end of lever 70 is bifurcated and supports a roller 74 that cooperates with a profiled ramp element 76 carried in cover 58 and extending generally radially with respect to shaft 16. The front surface of ramp element 76 is profiled to a predetermined curvature and is presented towards and engaged by roller 74. The radially inner end of ramp element 76 is carried in a stiff pivotal mounting on cup 58.

The orientation of ramp element 76 may be adjusted by an adjuster element 78. Adjuster element 78 is arranged in the shoulder of cup 58 on an axis parallel to the axis of the pivotal mount of ramp element 76 and has a hexagonal head with an eccentric pin received in a complementary hexagonal opening. In the mounted condition, the eccentric pin forms an abutment for the radially extending rear face of ramp element 76.

The abutment position for the rear face of ramp element 76 will vary according to the angular orientation of the adjuster element 78. The arrangement provides six different positions of adjustment for ramp element 76.

In operation, the arrangement of the flanges and associated elements when the pulley system is stationary, or rotating at low speed, is as shown in FIG. 1. Flanges 12 and 14 are spaced apart by their maximum distance as defined by abutment of central hub 24 with spring seat 54. In this condition, the spacing between flanges 12 and 14 exceeds the width of belt 20 so that at low speeds of rotation, no drive is imparted to belt 20.

As shaft 16 is rotated, cup 58 rotates, which drives movable flange 14 through the torque transmitter and guide 68. Rotation of movable flange 14 generates a centrifugal force upon weighted levers 70. As the speed of rotation increases, so does this centrifugal force until it produces a reaction between rollers 74 and the associated contoured front surfaces of the ramps 76 sufficient to overcome the compression force of spring 52. When this condition is reached, further increase in the speed of rotation of shaft 16 will cause levers 70 to pivot outwardly (clockwise as seen in FIG. 1). Thus, through reaction with ramp elements 76, movable flange 14 displaces towards fixed flange 12. As a result of this displacement, belt 20 will become engaged between flanges 12 and 14 and will be constrained to follow the rotation thereof. Further increases in the speed of rotation will produce progressively greater displacement of movable flange 14 towards fixed flange 12, thereby moving the radius of contact between belt 20 and the flanges 12 and 14 radially outwards to a greater diameter and varying the drive ratio between the pulley and the belt.

The geometry of centrifugal mechanism 66, and in particular the location, length and orientation of lever 70 in relation to the position of ramp 76 and the form of its contoured front surface is chosen such that, in relation to the characteristics of spring 52, the resultant axial thrust on movable flange 14 changes to maintain constant engine R.P.M. throughout the range of operation. In other words, once movable flange 14 has been initiated into driving engagement with belt 20, during further displacement of flange 14, the increased thrust generated by centrifugal mechanism 66 is counteracted by the increased resistance of spring 52 as it is compressed. So, the resultant thrust on movable flange 14 changes throughout the drive ratio range from this threshold condition to the condition shown in FIG. 2.

For a given application, e.g., for use in a snowmobile transmission wherein shaft 16 is the output shaft of a snowmobile engine, the dynamic characteristics of the drive pulley 10 are matched to the performance characteristics of the engine. It is a characteristic of an internal combination engine that such an engine will develop its maximum horse power at a given rpm, the developed horsepower being less at higher or lower speeds. Herein, this speed of rotation at which the maximum or rated horsepower of the engine is developed will be referred to as the "optimum rpm". It is desired to design a snowmobile transmission such that the engine, for the most part, will operate at the optimum rpm and therefore at maximum efficiency. The dynamic characteristics of the variable ratio drive pulley are therefore selected to ensure this result. Thus the engine operates more or less continuously at its optimum rpm, and variations in the load are accommodated by displacements of movable flange 14 thus varying the transmission ration between shaft 16 and the snowmobile track.

The described variable ratio drive pulley can readily be adapted for use with other engines and/or transmissions by replacement of levers 70 and ramp elements 76 by corresponding components having different characteristics in terms of weights, configurations, etc.

FIG. 3 shows an enlarged view of flanges 12 and 14 with belt 20 disposed therebetween. Each flange has an inner surface 80 that is disposed at an angle with respect to a longitudinal central axis Y—Y extending perpendicular to axis X—X of shaft 16 and between flanges 12 and 14. Inner surface 80 is the surface that belt 20 directly slides against during operation. Inner surface 80 is disposed at an angle δ that progressively varies from the inner edge 82 adjacent shaft 16 to outer edge 84 and is formed as part of an arc having a variable radius. Inner surface 80 has an angle α beginning at inner edge 82 as seen by the dashed line in FIG. 3, and an angle β at outer edge 84. The surface gradually and progressively changes inclination from α to β over the length of inner surface 80. A radius measured from a first point on surface 80 is different from a radius measured from at least a second point on the surface 80. This allows for a gradual change in the adjustability of pulley system 10 and allows belt 20 to smoothly ride the width of flanges 12 and 14 during operation. Because the radii upon which the curve is based varies, this design is different from a pulley flange with a curved surface having a constant radius.

As seen in FIG. 3, inner surface 80 is a smooth surface configured as a gradual curve. There are no steps or angled portions where the angle of the surface changes because the change occurs gradually and progressively from the inner edge 82 of the surface to the outer edge 84 of the surface. FIG. 3 shows both inner surfaces 80 progressively angled. However, in practice only one surface may be disposed at the progressively variable angle if so desired.

FIG. 4 schematically shows the curve of surface 80 based on different length radii measured from a common point A. Radius $r_1$ measured at a first point on surface 80 is different from radius $r_2$ measured from a second point on surface 80, which in turn is different from radius $r_3$. The surface may be formed as a curve with any number of different radii, but preferably at least two radii are different. The surface 80 can have an infinite number of curves formed therein. The precise curve is determined based on known mathematical formulas that accommodate belt material characteristics to account for belt deformation and are based on known stress and strain relationships.

Of course any angle can be used for optimal performance depending on the particular application. In this case, a sample angle α could be 12° from axis Y—Y, and angle β could be 14°. Another suitable angle for α could be 9° from axis Y—Y, and angle β could be 12°, for example. In any case, the progression from angle α to angle β can be determined using known computer modeling or mathematical formulas.

In an exemplary embodiment, the angles α and β can be determined from the theory of deformation of solid bodies under bending according to Timoshenko and Goodier. The Timoshenko equation of a trapezoidal prism is adapted by T. H. C. Child by adding the properties of an anisotropic material. For a noncompressible material the sum of the Poisson ratio must be equal to 1. The deformation of a such a body in a plane view is defined in equations (1)–(3):

$$\frac{\partial u}{\partial x} = v_x \left( \frac{1}{R} - \frac{1}{R_n} \right) x \qquad (1)$$

$$\frac{\partial v}{\partial y} = v_y \left( \frac{1}{R} - \frac{1}{R_n} \right) x \qquad (2)$$

$$\frac{\partial u}{\partial y} = -\frac{\partial v}{\partial x} = -v_y \left( \frac{1}{R} - \frac{1}{R_n} \right) \qquad (3)$$

wherein R is the radius of the belt, Rn is the natural radius of the belt after manufacturing, equation (1) defines the deformation of the belt in the direction of the X—X axis and equation (2) defines the deformation of the belt in the direction of the Y—Y axis. The variation of the slope at the cord level on the belt is defined by equation (4):

$$\partial \beta = \frac{v_y (B'/2)}{\frac{1}{R} - \frac{1}{R_n}} \qquad (4)$$

wherein B' is the belt width at cord level. For belts with a belt width to belt height ratio, B/H, ranging from 2.70 to 2.25 with a belt half angle from 13 to 15 degrees, Possion modulus in the Y—Y axis of 0.25 to 0.35, and a belt width B from 34 mm to 40 mm, the angle α for the pulley sheaves for a pulley diameter range of 47 to 280 mm is defined by equation (5):

$$\alpha = \tan^{-1}(0.0002 \cdot D + 2.054)$$

wherein D is the belt cord diameter when running in the pulley.

Belt 20 can be similarly angled to have an outer surface 21 that progressively varies. That way, the contact surface between flanges 12 and 14 with belt 20 could be designed with a curved configured to match the belt deformation as belt 20 moves on different radiuses of inner surface 80. Ideally, the side angle of outer surface 21 of belt 20 matches or complements the angle of inner surface 80 to obtain increased belt life and reduced power loss. However, matching is not required and may not be practical with respect to manufacturing tolerances and interchangeability of parts. Also, while both outer surfaces 21 are ideally progressively angled, it is not necessary that each surface, or any belt surface, be progressively angled.

By forming inner surface with a progressively variable inclination, belt life is increased because of more constant pressure distribution on belt 20. Performance and clutching are improved because flange and belt contact surfaces more closely match.

The components of the pulley system 10 can be made of any suitable materials. Flanges 12 and 14 and cup 58 may conveniently be fabricated as precision die-cast components in aluminum alloy, so that a minimum reworking of the assembly is necessary to achieve the dynamic balance, which is critical at the high operation speeds involved.

While exemplary embodiments have been chosen to illustrate the invention herein, it will be understood by those skilled in the art that various changes and modifications can be made without departing from the scope of the invention and its equivalents.

What is claimed is:

1. A variable drive pulley assembly for use in a transmission, comprising:
   a drive shaft rotatable about an axis of rotation;
   a fixed flange supported for rotation on the drive shaft, wherein the fixed flange has a first inner surface;
   a movable flange supported for rotation on the drive shaft and axially movable on the drive shaft toward and away from the fixed flange, wherein the movable flange has a second inner surface that faces the first inner surface; and
   a biasing mechanism disposed adjacent to the movable flange that displaces the movable flange with respect to the fixed flange;
   wherein at least one of the first inner surface and the second inner surface is disposed at an angle inclined from a reference line perpendicular to the axis of rotation, wherein the angle progressively varies across the at least one inner surface and follows an arc having a variable radius.

2. The variable drive pulley of claim 1, wherein both the first inner surface and the second inner surface are disposed at the angle that progressively varies inclined from the reference line.

3. The variable drive pulley of claim 1, wherein the first inner surface and the second inner surface each have a first edge adjacent to the drive shaft and a second edge disposed at an outer edge of the fixed flange and the movable flange, respectively, wherein the angle of the at least one inner surface progressively increases from the first edge to the second edge of the inner surface.

4. The variable drive pulley of claim 3, wherein the angle varies by approximately 2° from the first edge to the second edge.

5. The variable drive pulley of claim 3, wherein the angle of the inner surface at the first edge is approximately 12°, and the angle of the inner surface at the second edge is approximately 14°.

6. The variable drive pulley of claim 3, wherein the angle of the inner surface at the first edge is approximately 9°, and the angle of the inner surface at the second edge is approximately 12°.

7. The variable drive pulley of claim 1, wherein the at least one inner surface is smooth.

8. The variable drive pulley of claim 1, further comprising a drive belt disposed between the fixed flange and the movable flange, wherein the drive belt is slidable along the inner surfaces of the fixed flange and the movable flange.

9. The variable drive pulley of claim 8, wherein the belt has an outer surface that is complementary to the at least one inner surface of the respective fixed flange and movable flange.

10. The variable drive pulley of claim 8, wherein the belt has an outer surface that is disposed at a progressively variable angle with respect to the reference line perpendicular to the axis of rotation of the drive shaft.

11. The variable drive pulley of claim 8, wherein the belt is resilient.

12. The variable drive pulley of claim 8, wherein the belt is formed of rubber.

13. The variable drive pulley of claim 8 in combination with a constant variable transmission.

14. The variable drive pulley of claim 1 in combination with a constant variable transmission.

15. The variable drive pulley of claim 1 in combination with a vehicle.

16. The variable drive pulley of claim 1 in combination with a snowmobile.

17. The variable drive pulley of claim 1 in combination with an all terrain vehicle.

18. The variable drive pulley of claim 8, wherein a belt width to belt height ratio is between about 2.25 to 2.70.

19. A constant variable transmission comprising:
   a drive shaft rotatable about an axis of rotation;
   a pulley sheave assembly mounted on the drive shaft including
      a fixed flange supported for rotation on the drive shaft and having a first inner surface, and a movable flange, which is supported for rotation on the drive shaft and axially movable on the drive shaft toward and away from the fixed flange, having a second inner surface that faces the first inner surface, wherein at least one of the first inner surface and the second inner surface is disposed at a progressively variable angle with respect to a reference line that is perpendicular to the axis of rotation and follows an arc having a variable radius,
   a biasing mechanism disposed adjacent to the movable flange that displaces the movable flange with respect to the fixed flange, and
   a belt coupled to a drive mechanism and disposed around the drive shaft between the fixed flange and the movable flange, wherein the movable flange engages the belt and the belt moves across the first and second inner surfaces based on transmitted torque.

20. The constant variable transmission of claim 19, wherein the at least one inner surface is a smooth arcuate surface that changes inclination gradually.

21. The constant variable transmission of claim 19, wherein the belt has an outer surface that is disposed at a progressively variable angle that is complementary to the angle of the at least one inner surface.

22. The constant variable transmission of claim 19 wherein a belt width to belt height ratio is between about 2.25 to 2.70.

23. A method of transmitting drive force from an engine to a drive assembly while varying a drive ratio between a drive pulley assembly coupled to the engine and a transmission belt coupled to the drive assembly, including:
   providing a drive force to a rotatable shaft;
   transferring drive torque from the rotatable shaft to a drive pulley assembly having a fixed flange and a movable flange and moving the movable flange toward the fixed flange;
   engaging a transmission belt between inner facing radial surfaces of the fixed flange and the movable flange; and
   varying the drive ratio between the belt and the drive pulley assembly by sliding the belt across the inner surfaces of the fixed flange and the movable flange, wherein the inner surfaces are disposed at a progressively variable angle with respect to a reference line perpendicular to the axis of rotation of the rotatable shaft and follow an arc having a variable radius.

24. The method of claim 23, wherein the step of varying the drive ratio includes using a belt having an outer surface with a progressively variable angle that complements the angle of the inner surfaces.

25. The method of claim 23, wherein a belt width to belt height ratio is between about 2.25 to 2.70.

* * * * *